United States Patent [19]

Schreiber et al.

[11] Patent Number: 5,021,484

[45] Date of Patent: Jun. 4, 1991

[54] FIRE RETARDANT CURABLE 1-OXA-3-AZA TETRALINE (ALSO TERMED "3,4-DIHYDRO-1,3-BENZOXAZINE") DERIVED RESIN COMPOSITION

[75] Inventors: Herbert Schreiber, Wollerau; Wolfgang Saur, Buttikon, both of Switzerland

[73] Assignee: Gurit-Essex AG, Switzerland

[21] Appl. No.: 376,875

[22] Filed: Jul. 7, 1989

[30] Foreign Application Priority Data

Jul. 18, 1988 [CH] Switzerland .......................... 2733/88
Jun. 27, 1989 [CH] Switzerland .......................... 2383/89

[51] Int. Cl.$^5$ .................. C08K 5/34; C08K 5/15; C08K 3/38; C08K 3/32; C08K 3/26; C08K 3/22

[52] U.S. Cl. ..................... 524/100; 524/114; 524/200; 524/405; 524/415; 524/416; 524/417; 524/425; 524/436; 524/437

[58] Field of Search ............... 524/114, 405, 417, 425, 524/436, 437, 415, 416, 200, 100; 523/451, 445, 457; 528/162

[56] References Cited

U.S. PATENT DOCUMENTS

| | | | |
|---|---|---|---|
| 3,816,307 | 6/1974 | Woods | 523/445 |
| 4,080,501 | 3/1978 | Leman et al. | 524/100 |
| 4,356,282 | 10/1982 | Largman | 523/451 |
| 4,410,648 | 10/1983 | Kato et al. | 524/416 |
| 4,427,806 | 1/1984 | Zanvettor | 523/457 |
| 4,456,723 | 6/1984 | Breitenfellner et al. | 524/417 |
| 4,507,428 | 3/1985 | Higginbottom | 528/162 |

FOREIGN PATENT DOCUMENTS 606169 10/1978 Switzerland .
1437814 6/1976 United Kingdom .

*Primary Examiner*—Veronica P. Hoke
*Attorney, Agent, or Firm*—Tarolli, Sundheim & Covell

[57] ABSTRACT

A resin which may be cured to form a polymeric resin which is diffcultly inflammable and resistant to high temperatures, said resin being a mixture of (a) a resin component comprising at least one thermically curable 1-oxa-3-aza tetraline group containing compound and optionally a curable epoxy compound; and of (b) a second component comprising at least one flame retardant selected from the group consisting of: aluminum hydroxide; hydrated calcium magnesium carbonate; magnesium hydroxide; element red phosphorus, oxygen acids of phosphorus; inorganic salts of oxygen acids of phosphorus; organic salts of oxygen acids of phsophorus; polyphosphates; boric acid; salts of boric acid.

34 Claims, No Drawings

FIRE RETARDANT CURABLE 1-OXA-3-AZA TETRALINE (ALSO TERMED "3,4-DIHYDRO-1,3-BENZOXAZINE") DERIVED RESIN COMPOSITION

TECHNICAL FIELD

This invention relates to resins which may be cured to form polymeric resins which are difficultly inflammable an resistant to high temperatures, as well as to processes for preparing such polymeric resins More particularly, this invention relates to mixtures of 1-oxa-3-aza tetraline group containing compounds and flame retardants and to polymeric resins obtained by curing such mixtures.

BACKGROUND OF THE INVENTION

Compounds containing 1-oxa-3-aza tetraline groups and their prepolymers (hereafter called "oxazene resins" by convenience) are known, for example form Swiss Patents Nos. 574,978, 579,113 and 606,169. They can be obtained, for example, from phenols by reaction with formaldehyde and an amine, according to formula (A):

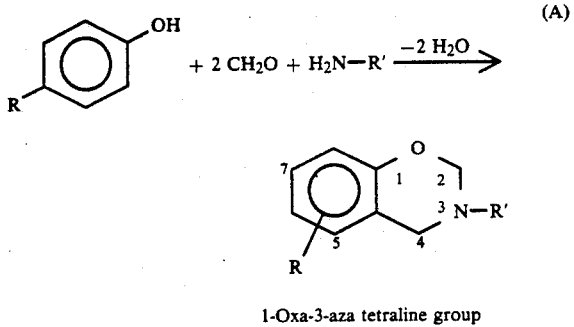

1-Oxa-3-aza tetraline group wherein R is, for example, hydrogen, halogen, alkyl or alkoxy, and R' is an aliphatic or aromatic group.

However, they can also be prepared by other processes leading to similar products.

In contrast to other known condensation reactions of phenols, amines and formaldehyde, in the reaction outlined above phenolic OH groups are consumed, it is thereby possible, according to the formula (A) hereinabove, to determine the amount of the synthesized 1-oxa-3-aza tetraline groups from the analytic determination of the said OH groups in the reaction mixture.

Prepolymers of 1-oxa-3-aza tetraline group containing compounds are also useful in preparing said oxazene resins. Since some of the 1-oxa-3-aza tetraline groups may react during polymerization, these prepolymers may contain a fewer number of said 1-oxa-3-aza tetraline groups than provided by the monomers used to form such prepolymers. It is essential, however, that the intermediately formed or hypothetic monomer reaction product does in fact contain 1-oxa-3-aza tetraline groups. This can easily be calculated by a person skilled in the art from the functionality. An oxazene resin, or its prepolymer, useful in accordance with the invention is, for instance, formed if the molar ratio is kept within the limits defined in Swiss Patent No. 606,169.

Phenol and phenol derivatives, respectively, as well as amines and formaldehyde are used as starting or basic materials for preparing the oxazene resin.

Preferably, for the present invention, 1-oxa-3-aza tetraline group containing compounds are used which are formally derived from a phenol and an amine, one of said components being more than monofunctional.

Examples of phenols that can be used include:
Monovalent phenols, such as phenol, m and p-cresol, m- and p-ethyl phenol, m- and p-isopropyl phenol, m- and p-isopropyloxy phenol m- and p-chloro phenol and betanaphthol. Meta-substituted phenols are preferred, since they do not include any blocked reactive positions.

Bivalent phenols, such as 4,4'-dihydroxydiphenylmethane, 3,3'-dihydroxy-diphenylmethane, 2,2'-bis-(4-hydroxyphenyl)-propane, 4,4'-dihydroxy-stilbene, hydroquinone, pyrocatechol, and resorcin.

Low-condensed phenol formaldehyde novolak resins, eventually mixed with a phenol.

Examples of amines that are particularly useful include:
Aniline, o-, m- and p-phenylene diamine, benzidine, 4,4'-diaminodiphenyl methane, cyclohexylamine, ethylenediamine, and propylenediamine.

Polymeric resins on the basis of 1-oxa-3-aza tetraline group containing compounds are resistant to high temperatures of more than 200° C., and up to more than 300° C. The flame resistance, despite the fact that it compares favorably with that of other polymeric resins resistant to high temperatures, such as for instance epoxy resins is still not sufficient for many uses. The attempt to improve said flame resistance by incorporating of halogen would result in the drawback that highly toxic gases of combustion are formed in case of fire.

It is known to improve the flame resistance of some inflammable polymeric resins, such as epoxide resins and unsaturated polyester resins, by addition of a flame retardant which is not mixable with the polymeric resin. However, for achieving self-extinguishing properties such a high amount of additive is necessary, for instance 200 phr and more, that the good mechanical properties of these resins are lost.

As usual, in the present specification "phr" means "parts by weight of additive per 100 parts by weight of resin".

Therefore, such systems are practically unsuitable for preparing highly reinforced polymeric resins. Difficultly inflammable phenolic resins are also out of the question for said use, since, per se, they already show much lower mechanical properties. In spite the serious toxicological doubts, no satisfying alternative to halogenated systems was found so far.

SUMMARY OF THE INVENTION

It now was found that oxazene resins can already be made self-extinguishing by addition of much lower amounts of flame retardants, for instance with such low amounts as 30 phr of ammonium polyphosphate aluminum hydroxide, and that products which are chemically stable and inflammable can be produced on this basis.

Broadly stated, the present invention provides for a resin which may be cured to form a polymeric resin which is difficultly inflammable and resistant to high temperatures of up to more than 280° C., said resin being a mixture of
(a) a resin component comprising at least one thermically curable 1-oxa-3-aza tetraline group containing compound; and of
(b) a second component comprising at least one flame retardant selected from the group consisting of:
aluminum hydroxide;
hydrated calcium magnesium carbonate;

magnesium hydroxide;
elemental red phosphorus;
oxygen acids of phosphorus;
inorganic salts of oxygen acids of phosphorus;
organic salts of oxygen acids of phosphorus;
polyphosphates;
boric acid; and
salts of boric acid.

DESCRIPTION OF THE PREFERRED EMBODIMENT

In a preferred embodiment of the invention the second component (b) of said resin comprises one or several compounds selected from the group consisting of:
aluminum hydroxide;
hydrated calcium magnesium carbonate;
magnesium hydroxide;
elemental red phosphorus;
oxygen acids of phosphorus;
inorganic salts of oxygen acids of phosphorus;
organic salts of oxygen acids of phosphorus;
polyphosphates;
boric acid;
salts of boric acid.

Resin component (a) may also comprise a curable epoxy compound.

The forming of bubbles at higher temperatures may be avoided by curing or tempering said resin at temperatures of above 180° C., and preferably at a temperature of 180° to 200° C.

These findings were highly surprising to one skilled in the art for various reasons.

As it is generally known, epoxy resins show a much worse flame resistance than resins on the basis of phenol formaldehyde condensates. Therefore, it was the fear of that good flame resistance properties might be destroyed by the addition of epoxide compounds. As a matter of fact, this supposition proved to be a fallacy.

On the other hand, it was to be expected that bubble formation would happen already at temperatures of more than 180° C. This supposition too proved to be a fallacy. Calcium magnesium carbonate hydrate, for instance, decomposes at 230° C., so that bubble formation was to be expected at temperatures above said temperature. However, it was found that polymeric resins on the basis of 1-oxa-3-aza tetraline group containing compounds and calcium magnesium carbonate hydrate, with or without an epoxide compound, not only remains completely stable at 280° C. but also does scarcely show any bubble formation above the place of burning.

Therefore, calcium magnesium carbonate hydrate is particularly useful for polymeric resins having no addition of epoxide compounds.

It was particularly surprising to note that with oxazene resins the desired result can by obtained with much less flame retardant than with epoxide resins alone or with oxazene/epoxide resins. For instance, outstanding results may already be obtained with the following amounts of aluminum hydroxide (Al(OH)$_3$):

| Oxazene resin | 40 phr Al(OH)$_3$ |
| Oxazene/epoxide resin | 90 phr Al(OH)$_3$ |
| Epoxide resin | about 200 phr Al(OH)$_3$ |

There is no upper limit for the amount of additive, except that of processing technology. Amounts up to 300 phr aluminum hydroxide may be used for molding compositions.

As used throughout this specification, "aluminum hydroxide" stands for the compound of the chemical formula Al(OH)$_3$. This compound is not identical with the compounds known as fillers and having the composition AlO-OH (aluminum oxide monohydrate, bauxite, et al).

Throughout this specification. "calcium magnesium carbonate hydrate" stands for "hydrated calcium magnesium carbonate". A suitable compound for instance, shows the following analytical results for its main components:
38% MgO
8% CaO
53% ignition loss (=44% $CO_2$+9% $H_2O$).

Elemental red phosphorus is preferably used in microencapsulated form. Suitable encapsulation compounds are, for instance, epoxide compounds.

Advantageously, resin component (a) further comprises at least one curable epoxy compound preferably in an amount of at least 5 parts by weight, and particularly of 5 to 60 parts by weight per 100 parts by weight of the 1-oxa-3-aza tetraline group containing compound.

For this purpose, mono- or polyfunctional epoxide compounds which may be cured thermically, catalytically or by means of hardeners, and which generally are called epoxide resins, are suitable. Such suitable epoxide compounds are described in:

Sidney H. Goodman, Handbook of Thermoset Plastics, Noyes Publications, Park Ridge, NJ;
W. G. Potter, Epoxide Resins, Ilife Books, London;
Henry Lee and Kris Neville, Handbook of Epoxy Resins, McGraw-Hill Book Company, New York/San Francisco/Toronto/London.

Preferabky, aluminium hydroxide is used in an amount of at least 40 phr, calcium magnesium carbonate hydrate in an amount of at least 50 phr, ammonium polyphosphate and melamine phosphate in an amount of at least 20 phr. These additives can also be applied in coated form, for instance with a stearate or silane coating.

By thermally curing said curable resins at temperatures above 100° C., preferably at a temperature from 140° to 220° C., difficulty inflammable polymeric resins which are resistant to high temperatures and heat are obtained.

Advantageously, the cured polymeric resins, especially those containing aluminum hydroxide but no epoxide compounds, are subject to a thermal aftertreatment, preferably at temperatures of 180° to 220° C. The duration of this tempering depends on the temperature level. The following guide values may serve as clues, however, the duration may be extended at will without damage of the polymer resins:
24 h at 180° C.; or
4 h at 200° C.; or
30 min at 220° C.

These durations can be proportionally combined at will. For instance, the following tempering cycle has proved successful:
30 min at 200° C.+30 min at 220° C.+30 min at 230° C.+30 min at 250° C.

By using systems containing melamine phosphate self-extinguishing foam plastics can be produced without addition of a special foaming agent. This finding too was surprising for a person skilled in the art, since melamine phosphate in the absence of the resin is stable up to temperatures of 300° C.

The properties of the polymeric resins produced as described above can be tailored for certain applications by addition of usual additives. The following additives are of particular importance:

reinforcement fibers, such as glass, quartz, carbon, mineral and synthetic fibers, int he usual forms of short fibers, staple fibers, threads, fabrics or mats;
plasticizers, especially phosphorus compounds;
carbon black or graphite;
fillers;
dyestuffs;
micro hollow spheres;
metal powder.

The processes known for phenol formaldehyde resins or epoxy resins, such as hot-pressing of prepregs, SMC (Sheet Molding Compound); or molding; casting; filament winding; or vacuum impregnating are suitable for processing the resins according to the invention. With respect to vacuum impregnating, very fine additives having a particle size of less than 0.001 mm are particularly suitable.

EXAMPLES

In the following Examples, the starting compounds and materials specified hereafter were used.

1-Oxa-3-aza tetraline compound 1 prepared by reacting 4,4'-diamino-diphenylmethane with phenol and formaldehyde in a molar ratio of 1:2:4. Structural formula:

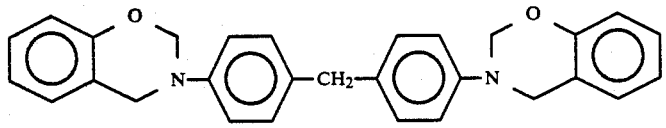

1-Oxa-3-aza tetraline compound 2 prepared form the reaction product of 2 mols phenol and 1 mol formaldehyde by a second reaction with 2 mols aniline and 4 mols formaldehyde. Mean composition:

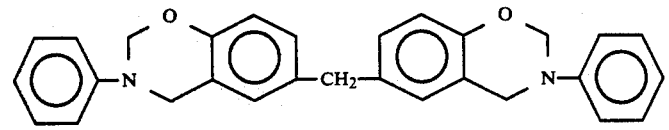

1-Oxa-3-aza tetraline compound 3 prepared by reaction phenol with aniline and formaldehyde in a molar ratio of 1:1:2. Structural formula:

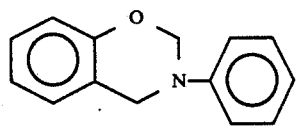

Epoxide compound 1

Liquid bisphenol A gycidylether, epoxide equivalent weight=200 (Trade name "Epikote 828").

Epoxide compound 2

3,4 epocyclohexylmethyl-3,4-epoxy-cyclohexade carboxylate
(Trade name "Araldite CY 179").

Butandiol-diglycidyl-ether (Trade name "Araldite DY 026")

Aluminum hydroxide 1

$Al(OH)_3$. Mean particle size 0.0008 mm.

Aluminum hydroxide 2

$Al(OH)_3$. Mean particle size 0.020 to 0.025 mm.

Calcium magnesium carbonate

Hydrated calcium magnesium carbonate, 38% Ca. 8% Mg, ignition loss (700° C.) 53% (44% $CO_2$, 9% $H_2O$) mean particle size 0.00016 mm.

Magnesium hydroxide $Mg(OH)_2$, mean particle size 0.0012 mm, ignition loss (1000° C.) 32%.

Ammonium polyphosphate $(NH_4)_{n+2}P_nO_{3n+1}$, phosphorus content 32%, mean particle size 0.03 mm.

Melamine phosphate $C_3H_6N_6.H_3PO_4$, particle size <0.075 mm.

Dimelamine phosphate $(C_3H_6N_6)_2.H_3PO_4$, particle size <0.075 mm.

Red phosphorus

Amorphous, particle size 0.001 to 0.050 mm.

Phosphorus acid $H_3PO_3$, crystalline, ground.

Orthophosphoric acid $H_3PO_4$, liquid.

Boric acid $H_3BO_3$, crystalline, ground.

Glass fabric 1

200 g/m², number of ends/cm=7×7, aminosilane finish.

Glass fabric 2

110 g/m², number of ends/cm=24×24, aminosilane finish.

Test plates were prepared by curing the resin/additive mixtures for 2 hours at 200° C. between teflonized glass plates. For specimens containing glass fabrics, the glass fabric was first vacuum impregnated with the resin/additive mixture at 120° C., then the plate was cured between glass plates.

Inflammability was tested in accordance with Specification UL 94 vertical Test. When judging the results, the thickness of the specimens is to be taken into consideration, since thicker specimens more easily meet the classifications UL 94 V than thinner ones.

Heat resistance was tested by heating the specimens for 15 hours to 280° C. and thereafter determining the change of volume.

All specimens with a negative change of volume do not show any bubble formation or other damages.

EXAMPLES 1 TO 27

The test results are compiled in Tables 1 and 2 hereafter.

TABLE 1

|  | Reference | | | | Example No. | | | | | | | | | | | | |
|---|---|---|---|---|---|---|---|---|---|---|---|---|---|---|---|---|---|
|  | 1 | 1a | 2 | 3 | 1 | 2 | 2a | 3 | 4 | 5 | 6 | 7 | 8 | 9 | 10 | 11 | 12 |
| Composition (Parts by weight) | | | | | | | | | | | | | | | | | |
| 1-Oxa-3-aza-tetraline compound 1 | 30 | 30 | 20 | 30 | 30 | 30 | 20 | 20 | 20 | — | — | 20 | 24 | 30 | 20 |
| 1-Oxa-3-aza-tetraline compound 2 | — | — | — | — | — | — | — | — | — | — | 24 | — | — | — | 10 |
| 1-Oxa-3-aza-tetraline compound 3 | — | — | — | — | — | — | — | — | — | 24 | — | — | — | — | — |
| Epoxide compound 1 | — | — | 10 | — | — | — | 10 | 10 | 10 | — | — | — | — | — | — |
| Epoxide compound 2 | — | — | — | — | — | — | — | — | — | 6 | 6 | 10 | 6 | — | — |
| Butandiol-diglycidyl-ether | — | — | — | — | — | — | — | — | — | — | — | — | — | — | — |
| Aluminium hydroxide 1 | — | — | — | 10 | 15 | 15 | 10 | 10 | 15 | 12 | 10 | 10 | 10 | — | — |
| Aluminium hydroxide 2 | — | — | — | — | — | — | 10 | 10 | — | 12 | 10 | 10 | 10 | — | — |
| Calcium magnesium carbonate | — | — | — | — | — | — | — | — | — | — | — | — | — | 15 | 30 |
| Magnesium hydroxide | — | — | — | — | — | — | — | — | — | — | — | — | — | — | — |
| Ammonium polyphosphate | — | — | — | — | — | — | — | — | — | — | — | — | — | — | — |
| Melamine phosphate | — | — | — | — | — | — | — | — | — | — | — | — | — | — | — |
| Dimelamine phosphate | — | — | — | — | — | — | — | — | — | — | — | — | — | — | — |
| Red phosphorus | — | — | — | — | — | — | — | — | — | — | — | — | — | — | — |
| Phosphorous acid | — | — | — | — | — | — | — | — | — | — | — | — | — | — | — |
| Orthophosphoric acid | — | — | — | — | — | — | — | — | — | — | — | — | — | — | — |
| Boric acid | — | — | — | — | — | — | — | — | — | — | — | — | — | — | — |
| Glass fabric 1 (layers/mm) | — | — | — | — | — | — | — | 3.3 | — | — | — | — | 3.3 | — | — |
| Glass fabric 2 (layers/mm) | — | 10 | — | 10 | — | 10 | — | — | 10 | — | — | — | — | — | — |
| Tests (Unit) | | | | | | | | | | | | | | | | | |
| UL 94 Vertical Test: | | | | | | | | | | | | | | | | | |
| Thickness (mm) | 4 | 1.0 | 1.0 | 1.0 | 0.9 | 1.8 | 1.2 | 1.0 | 1.2 | 0.9 | 1.0 | 1.2 | 1.0 | — | 1.0 | 1.0 |
| Total burning duration (s) | — | — | — | — | 80 | 5 | 20 | 20 | 17 | 185 | 18 | 25 | 5 | — | 10 | 80 |
| Longest burning duration (s) | — | — | — | — | 14 | 1 | 3 | 3 | 3 | 19 | 7 | 7 | 3 | — | 1 | 9 |
| Burning up to the top | — | + | + | + | — | — | — | — | — | — | — | — | — | — | — | — |
| Class UL 94 | V1 | — | — | — | V1 | V0 | V0 | V0 | V0 | V1 | V0 | V0 | V0 | — | V0 | V1 |
| Glass transition temperature[1] (°C.) | — | — | — | — | — | — | — | — | — | — | — | — | — | — | — | — |
| after tempering 4 h/220° C. (°C.) | — | — | — | — | — | — | — | — | — | — | — | — | — | — | — | — |
| Flexural strength (N/mm$^2$) | — | — | — | — | — | — | — | — | — | — | — | — | — | — | — | — |
| Annotations | — | — | — | — | (2) | (2) | (3) | (2) | — | — | — | — | — | — | — | — |
| Volume change 15 h/280° C. (%) | — | — | — | — | — | 80 | 0 | — | −8 | −4 | −4 | — | — | — | −2.5 | −9 |

[1]Thermomechanical analysis
(2) Swelling above the burning zone
(3) Tempering: 30 min/200° C. + 30 min/220° C. + 30 min/230° C: no bubble formation after 15 h/280° C.

TABLE 2

|  | Example No. | | | | | | | | | | | | | | |
|---|---|---|---|---|---|---|---|---|---|---|---|---|---|---|---|
|  | 13 | 14 | 15 | 16 | 17 | 18 | 19 | 20 | 21 | 22 | 23 | 24 | 25 | 26 | 27 |
| Composition (Parts by weight) | | | | | | | | | | | | | | | |
| 1-Oxa-3-aza tetraline compound 1 | — | — | — | — | — | — | — | — | — | — | — | — | — | — | — |
| 1-Oxa-3-aza tetraline compound 2 | — | — | — | — | 30 | 21 | 21 | 30 | 30 | 50 | 50 | 50 | 40 | — | — |
| 1-Oxa-3-aza tetraline compound 3 | 30 | 24 | 24 | 21 | — | — | — | — | — | — | — | — | — | 28 | 28 |
| Epoxide compound 1 | — | 6 | 6 | 9 | — | 9 | 9 | — | — | — | — | — | — | — | — |
| Epoxide compound 2 | — | — | — | — | — | — | — | — | — | — | — | — | — | — | — |
| Butandiol-diglycidyl-ether | — | — | — | — | — | — | — | — | — | — | — | — | — | 12 | 12 |
| Aluminium hydroxide 1 | 24 | 10 | 12 | 12 | 15 | 10 | 12 | — | — | — | — | — | — | — | — |
| Aluminium hydroxide 2 | — | 20 | 24 | 24 | — | 20 | 24 | — | — | — | — | — | — | — | — |
| Calcium magnesium carbonate | — | — | — | — | — | — | — | — | — | — | — | — | — | — | — |
| Magnesium hydroxide | — | — | — | — | — | — | — | 30 | — | — | — | — | — | — | — |
| Ammonium polyphosphate | — | — | — | — | — | — | — | — | 9 | — | — | — | — | — | — |
| Melamine phosphate | — | — | — | — | — | — | — | — | — | 25 | — | — | — | — | — |
| Dimelamine phosphate | — | — | — | — | — | — | — | — | — | — | 25 | — | — | — | — |
| Red phosphorus | — | — | — | — | — | — | — | — | — | — | — | 1 | — | — | — |
| Phosphorous acid | — | — | — | — | — | — | — | — | — | — | — | — | 10 | — | — |
| Orthophosphoric acid | — | — | — | — | — | — | — | — | — | — | — | — | — | 10 | — |
| Boric acid | — | — | — | — | — | — | — | — | — | — | — | — | — | — | 10 |
| Glass fabric 1 (layers/mm) | — | — | — | — | — | — | — | — | — | — | — | — | — | — | — |
| Glass fabric 2 (layers/mm) | — | — | — | — | — | — | — | — | — | — | — | — | — | — | — |
| Tests (Unit) | | | | | | | | | | | | | | | |
| UL 94 Vertical Test: | | | | | | | | | | | | | | | |
| Thickness (mm) | 1.0 | 1.0 | 1.0 | 1.0 | 0.8 | 1.0 | 1.0 | 0.9 | 0.8 | 1.0 | 2 | 2 | 3 | 3 | 3 |

TABLE 2-continued

| | Example No. | | | | | | | | | | | | | | |
|---|---|---|---|---|---|---|---|---|---|---|---|---|---|---|---|
| | 13 | 14 | 15 | 16 | 17 | 18 | 19 | 20 | 21 | 22 | 23 | 24 | 25 | 26 | 27 |
| Total burning duration (s) | 24 | 66 | 24 | 90 | 13 | 54 | 20 | 15 | 16 | 15 | 35 | 0 | 0 | 3 | 5 |
| Longest burning duration (s) | 5 | 21 | 9 | 24 | 3 | 21 | 4 | 2 | 4 | 3 | 10 | 0 | 0 | 8 | 10 |
| Burning up to the top | V0 | V1 | V0 | V1 | V0 | V1 | V0 | V0 | V0 | V0 | V0 | V0 | V0 | V0 | V0 |
| Class UL 94 | | | | | | | | | | | | | | | |
| Glass transition temperature[1] (°C.) | 103 | 108 | — | — | 153 | — | 121 | — | — | — | — | — | — | — | — |
| after tempering 4 h/220°C. (°C.) | — | — | — | — | 162 | — | 158 | — | — | — | — | — | — | — | — |
| Flexural strength (N/mm$^2$) | — | — | — | — | 140 | — | 100 | — | — | — | — | — | — | — | — |
| Annotations | — | — | — | — | — | — | — | — | — | (4) | (4) | — | (4) | (4) | (4) |
| Volume change 15 h/280° C. (%) | — | — | — | — | — | — | — | — | — | — | — | — | — | — | — |

[1]Thermomechanical analysis
(4) Foamed after curing

EXAMPLE 28

An impregnating solution was prepared from 330 g 1-oxa-3-aza tetraline compound 1, 170 g epoxide compound 2, 200 g toluene, 390 g aluminum hydroxide 2 and 210 g aluminum hydroxide 1. Glass fabric 2 was lacquered with this solution and dried in a hot-air channel. 10 Layers of this prepreg were hot-pressed at 160° C. to form a laminate of 1 mm thickness which was cured for 1 h at 220° C.

The laminate showed the following properties:

| Classification | UL 94-V0 |
|---|---|
| Flexural strength: | |
| Warp direction | 440 N/mm$^2$ |
| Weft direction | 385 N/mm$^2$ |
| Modulus of elasticity | 20000 N/mm$^2$ |
| Specific volume resistance: | |
| at room temperature | $10^{16}$ Ohm · cm |
| at 200° C. | $4 \cdot 10^{11}$ Ohm · cm |
| at 250° C. | $5 \cdot 10^{09}$ Ohm · cm |
| after moist storage (95% rel. h.) | $6 \cdot 10^{13}$ Ohm · cm |
| Surface resistance: | |
| at room temperature | $>10^{15}$ Ohm |
| at 200° C. | $5 \cdot 10^{11}$ Ohm |
| at 150° C. | $4 \cdot 10^{10}$ Ohm |
| after moist storage (95% rel. h.) | $>10^{15}$ Ohm |
| Dielectric constant (1 MHz) | 5.5 |
| Loss factor (1 MHz) | 0.02 |

EXAMPLE 29

In a manner analogous to that described in Example 28, a laminate of 1 mm thickness was prepared from 500 g 1-oxa-3-aza tetraline compound 2 and 300 g aluminum hydroxide. Curing: 1 h at 180° C.

The laminate showed the following properties:

| Classification | UL 94-V0 |
|---|---|
| Flexural strength | 440 N/mm$^2$ |
| Modulus of elasticity | 22000 N/mm$^2$ |

We claim:

1. A resin which may be cured to form a polymeric resin which is difficultly inflammable and resistant to high temperatures, said resin being a mixture of
  (a) a resin component comprising at least one thermically curable 1-oxa-3-aza tetraline group containing compound; and of
  (b) a second component comprising at least one flame retardant selected from the group consisting of:
     aluminum hydroxide;
     hydrated calcium magnesium carbonate;
     magnesium hydroxide;
     elemental red phosphorus;
     oxygen acids of phosphorus;
     inorganic salts of oxygen acids of phosphorus;
     organic salts of oxygen acids of phosphorus;
     polyphosphates;
     boric acid; and
     salts of boric acid.

2. The resin of claim 1 wherein component (b) comprises at least 50 parts by weight of magnesium hydroxide per 100 parts by weight of resin.

3. The resin of claim 1 wherein component (b) comprises an ammonium polyphosphate.

4. The resin of claim 3 wherein component (b) comprises an ammonium polyphosphate of the formula $(NH_4PO_3)_n$.

5. The resin of claim 3 wherein component (b) comprises an ammonium polyphosphate of the formula $(NH)_{n+2}P_nO_{3n+1}$.

6. The resin of claim 3 wherein component (b) comprises at least 20 parts by weight ammonium polyphosphate per 100 parts by weight of resin component (a).

7. The resin of claim 1 wherein component (b) comprises a melamine phosphate.

8. The resin of claim 7 wherein component (b) comprises a monomelamine phosphate of the formula $C_3H_6N_6H_3PO_4$.

9. The resin of claim 7 wherein component (b) comprises a dimelamine phosphate of the formula $(C_3H_6)_2H_3PO_4$.

10. The resin of claim 7 wherein component (b) comprises at least 20 parts by weight of melamine phosphate per 100 parts by weight of resin component (a).

11. The resin of claim 1 wherein component (b) comprises zinc borate.

12. The resin of claim 1 wherein the resin comprises at least 40 parts by weight of aluminum hydroxide per 100 parts by weight of resin component (a).

13. The resin of claim 1 wherein the resin comprises at least 50 parts by weight of hydrated calcium magnesium carbonate per 100 parts by weight of resin component (a).

14. The resin of claim 1 wherein the 1-oxa-3-aza tetraline group comprising compound is formally derived from a phenol and and an amine, one of said components being more than monofunctional.

15. A resin which may be cured to form a polymeric resin which is difficultly inflammable and resistant to high temperatures, said resin being a mixture of
  (a) a resin component comprising at least one thermically curable 1-oxa-3-aza tetraline group containing compound and a curable epoxy compound; and of
  (b) a second component comprising at least one flame retardant selected from the group consisting of:

aluminum hydroxide;
hydrated calcium magnesium carbonate;
magnesium hydroxide;
elemental red phosphorus;
oxygen acids of phosphorus;
inorganic salts of oxygen acids of phosphorus;
organic salts of oxygen acids of phosphorus;
polyphosphates;
boric acid; and
salts of boric acid.

16. The resin of claim 15 wherein component (b) comprises at least 50 parts by weight of magnesium hdyroxide per 100 parts by weight of resin.

17. The resin of claim 15 wherein component (b) comprises an ammonium polyphosphate.

18. The resin of claim 17 wherein component (b) comprises an ammonium polyphosphate of the formula $(NH_4PO_3)_n$.

19. The resin of claim 17 wherein component (b) comprises an ammonium polyphosphate of the formula $(NH)_{n+2}P_nO_{3n+1}$.

20. The resin of claim 17 wherein component (b) comprises al least 20 parts by weight ammonium polyphosphate per 100 parts by weight of resin component (a).

21. The resin of claim 15 wherein component (b) comprises a melamine phosphate.

22. The resin of claim 21 wherein component (b) comprises a monomelamine phosphate of the formula $C_3H_6N_6H_3PO_4$.

23. The resin of claim 21 wherein component (b) comprises a dimelamine phosphate of the formula $(C_3H_6N_6)_2H_3PO_4$.

24. The resin of claim 21 wherein component (b) comprises at least 20 parts by weight of melamine phosphate per 100 parts by weight of resin component (a).

25. The resin of claim 15 wherein component (b) comprises zinc borate.

26. The resin of claim 15 wherein the resin comprises at least 40 parts by weight of aluminum hydroxide per 100 parts by weight of resin component (a).

27. The resin of claim 15 wherein the resin comprises at least 50 parts by weight of hydrated calcium magnesium carbonate per 100 parts by weight of resin component (a).

28. The resin of claim 15 wherein the 1-oxa-3-aza tetraline group comprising compound is formally derived from a phenol and an amine, one of said components being more than monofunctional.

29. The resin of claim 15 wherein resin component (a) comprises at least 5 parts by weight of epoxy compound per 100 parts by weight of 1-oxa-3-aza tetraline group containing compound.

30. The resin of claim 29 wherein resin component (a) comprises from 5 to 60 parts by weight of epoxy compound per 100 parts by weight of 1-oxa-3-aza tetraline group containing compound.

31. A process for preparing polymeric resins which are difficultly inflammable and resistant to high temperatures wherein a resin according to claim 1 is cured or tempered.

32. The process of claim 31 wherein a resin comprising aluminum hydroxide is cured or tempered at a temperature of 180° to 200° C.

33. A process for preparing polymeric resins which are difficulty inflammable and resistant to high temperatures wherein a resin according to claim 15 is cured or tempered.

34. The process of claim 33 wherein a resin comprising aluminum hydroxide is cured or tempered at a temperature of 180° to 200° C.

* * * * *